UNITED STATES PATENT OFFICE.

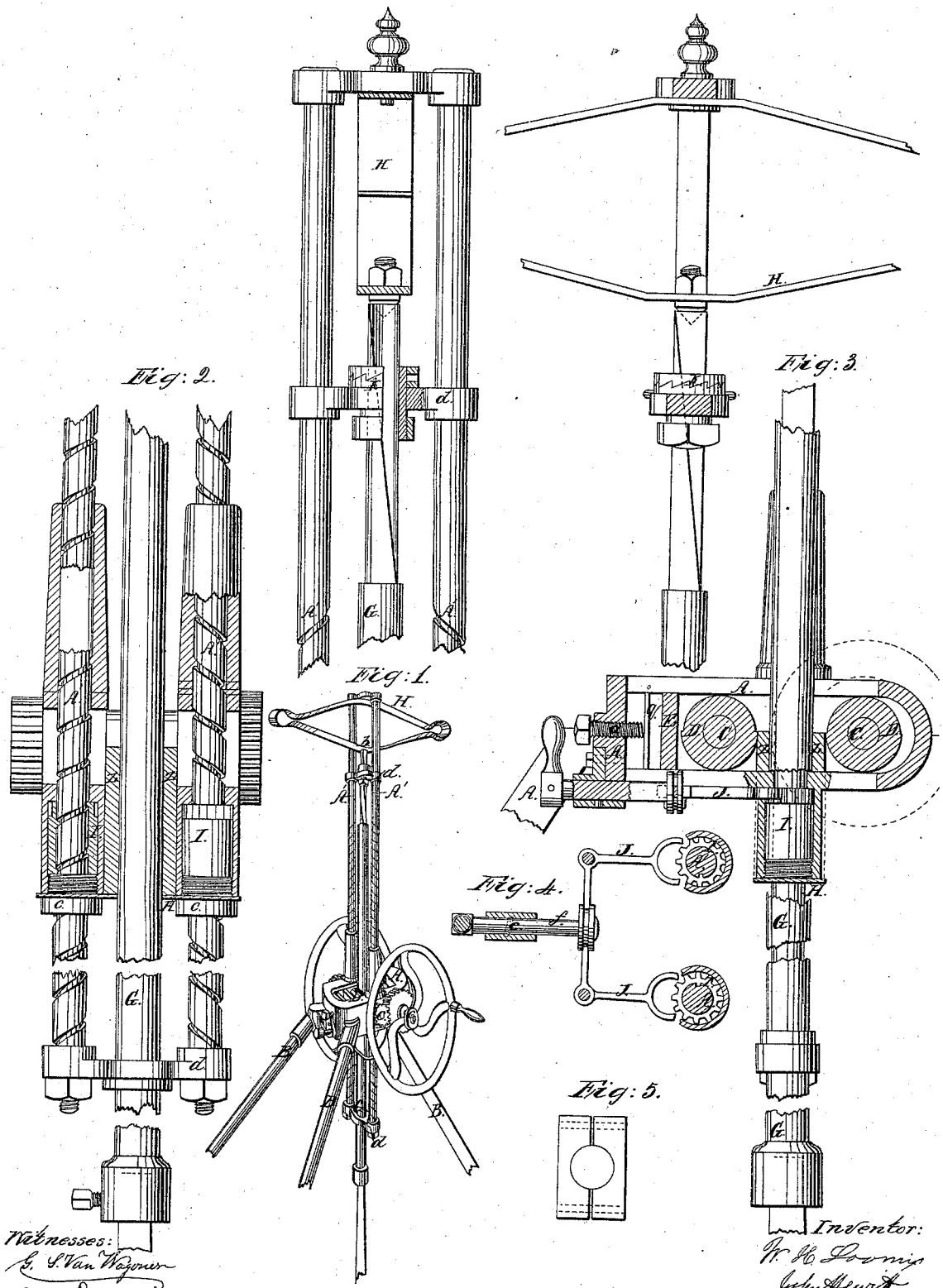

W. H. LOOMIS AND JOHN HEWITT, OF ST. LOUIS, MISSOURI.

ROCK-DRILL.

Specification of Letters Patent No. 21,205, dated August 17, 1858.

*To all whom it may concern:*

Be it known that we, W. H. LOOMIS and JOHN HEWITT, of the city of St. Louis and State of Missouri, have invented a new and useful Improvement in Rock-Drills; and we do hereby declare that the following is a full, clear, and exact description of the same, reference being had to the annexed drawing, making a part of this specification, in which—

Figure 1 is a perspective, Fig. 2 a section through the two guide rods A' A', and Fig. 3 is a vertical section through the drill bar, and between the said guide rods.

The nature of our invention consists, first, in providing the drill bar with grooved guide rods, which shall follow the drill bar down as fast as the drill advances in the rock, so as to keep the guides of the said bar always the same distance from its top and bottom end. Second, in introducing a friction box between the cams and drill bar whereby the said bar will be lifted by the action of the said cams without injury from them.

The construction and operation of our invention will be understood from the following description of the aforesaid drawing, on which similar letters represent corresponding parts on the different figures.

The frame A is fixed on the legs shown at B B B Fig. 1 which constitutes a tripod as shown. The two shafts C C are fixed in the frame, one in a stationary and the other in an adjustable bearing and on them the two cams are placed—shown at D D.

The adjustable bearing, of one of the cam shafts is shown at E, and behind it a spring is placed shown at Q, which is acted upon by the adjusting screw *a* whereby the energy of the cams against the drill bar is regulated.

The drill bar G passes up through the frame between the two guide rods, and through the cross heads *d d* against a pivot fixed in the spring H as shown at *b*.

One of the rods A' A' has a left and the other a right hand thread on it, and they are made to pass through guide holes made in the frame to receive them—as shown— and their top and bottom ends are secured by means of cross heads whereby they are made to rise and fall together. On each of the aforesaid guide rods a nut is placed which is introduced in the bottom end of the guide holes of the said rods, as shown at I I Figs. 2 and 3. These nuts have threads in them to correspond with the threads on the rods, and they are held in their places by means of nuts shown at *c c* which screw in the lower end of the frame—as shown.

On the upper end of each of the nuts I I a ratchet is made, in which the pawls J J are made to work, so as to prevent the guides, from rising with the drill bar and so as to hold them in any given position. The operation of the said pawls is to be hereinafter described.

Between the cams and around the drill bars a friction box is placed, against which the cams operate. This friction box is made of two parts as shown at Fig. 5, with their inside faces a short distance apart, so as to allow them to hug the drill bars, when the pressure of the cams is against them, and one side of it is held from dropping below the other by means of rivets passed through it loosely, so as to allow it to close against the drill bar and yet let it slide freely up and down on the said bar, so that the cams in their action will cause the said box to lift the drill bar by pressing it against it, and as soon as the cams cease their action the friction box will fall to the plate H and remain there until the succeeding revolution of the cam, when the drill will be again lifted, and so on.

The top end of the drill bar is made square, and then twisted, so that the said square forms a helix, which passes through the socket K. This socket has a flange around its top and in its bottom side ratchet-teeth are cut, which work in corresponding ratchet teeth cut in a boss on the crosshead *d*. Now when the drill bar is raised it is gripped by the friction box, so that the helix must turn the socket ratchet from one tooth of the ratchet to the other whereby the drill bar in falling will have to turn a distance equal to the throw of the helix, thus causing the drill bar to rotate.

The two pawls J J Fig. 4 are made in the form of bell cranks, one end of which works in a groove made in the end of a small shaft, as shown at *f*. This shaft has a pin fixed in it which works in a helix cut in the socket through which the shaft is made to work, as shown at *e*, so that in turning the shaft from one side to the other it will advance and recede, thus throwing the pawls in or out of gear, as the case may require.

Now it will be seen that when the shaft *f* is made to advance toward the guide rods the pawls will be thrown in gear, so as to prevent the nuts I I from turning in but one direction, which will allow the two guide rods to follow the drill bar, down but prevent them from rising with it, whereby the crossheads d d (which serves as guides to the drill bar) will always be the same distance from the top and bottom end of the said drill bar. When it is desired to raise the drill the shaft f is made to recede from the guide rods so as to throw the pawls in gear on the opposite side of the ratchet wheels, whereby the said rods are left free to rise but not to fall, so that one drill may be removed and another replaced, and when it is desired to commence work, the shaft f is reversed and the drill falls to the ground along with the guide rods A' A'.

The force with which the drill strikes the rock is regulated by the spring H.

What we claim as our invention, and desire to secure by Letters Patent is—

The combination of the two grooved guide rods A' A' with the drill bar, and the two pawls J J and nuts I I whereby the two guide rods are allowed to fall with the drill bar, so as to keep the top and bottom guides always the same distance from the end of the drill bar, all substantially as herein set forth.

W. H. LOOMIS.
JOHN HEWITT.

Witnesses:
G. L. VAN WAGONER,
AMOS BROADNAX.